United States Patent
Bafile et al.

(10) Patent No.: US 11,215,495 B2
(45) Date of Patent: Jan. 4, 2022

(54) PRESSURE BASED LOAD SENSING SYSTEM

(71) Applicant: JLG Industries, Inc., McConnellsburg, PA (US)

(72) Inventors: Louis A. Bafile, Mercersburg, PA (US); James N. Smyly, Hagerstown, MD (US); Aaron A. Powers, Chambersburg, PA (US); Brendan Kotlanger, Waynesboro, PA (US)

(73) Assignee: JLG INDUSTRIES, INC., McConnellsburg, PA (US)

( * ) Notice: Subject to any disclaimer, the term of this patent is extended or adjusted under 35 U.S.C. 154(b) by 264 days.

(21) Appl. No.: 16/480,041

(22) PCT Filed: Jan. 24, 2018

(86) PCT No.: PCT/US2018/014963
§ 371 (c)(1),
(2) Date: Jul. 23, 2019

(87) PCT Pub. No.: WO2018/140439
PCT Pub. Date: Aug. 2, 2018

(65) Prior Publication Data
US 2020/0003607 A1 Jan. 2, 2020

Related U.S. Application Data

(60) Provisional application No. 62/450,274, filed on Jan. 25, 2017.

(51) Int. Cl.
*G01G 5/06* (2006.01)
*B66F 17/00* (2006.01)
(Continued)

(52) U.S. Cl.
CPC ............. *G01G 5/06* (2013.01); *B66F 17/006* (2013.01); *G01G 19/083* (2013.01); *B66F 11/042* (2013.01)

(58) Field of Classification Search
CPC .. G01G 5/06; G01G 5/04; G01G 5/00; G01G 19/03; G01G 19/027; G01G 19/00;
(Continued)

(56) References Cited

U.S. PATENT DOCUMENTS 4,456,093 A 6/1984 Finley et al.
4,511,974 A * 4/1985 Nakane ................ G01G 19/083
340/685

(Continued)

FOREIGN PATENT DOCUMENTS

CN 85106408 A 12/1986
CN 86201805 U 2/1987
(Continued)

OTHER PUBLICATIONS

Chinese Office Action dated Sep. 2, 2020 issued in Chinese Patent Application No. 201880021853.X and English translation, 13 pp.
(Continued)

*Primary Examiner* — Mohamed Charioui
(74) *Attorney, Agent, or Firm* — Nixon & Vanderhye P.C.

(57) ABSTRACT

A load sensing system measures lift cylinder pressure and platform height to estimate platform load. The system functions to prevent overload and is designed to comply with regulatory requirements. The system provides the advantages of a force-based approach using simple, lower cost pressure-based measurement components.

13 Claims, 4 Drawing Sheets

(51) Int. Cl.
*G01G 19/08* (2006.01)
*B66F 11/04* (2006.01)

(58) Field of Classification Search
CPC ... G01G 19/083; B66F 17/006; B66F 17/003; B66F 17/00; B66F 11/042; B66F 11/04; B66F 11/00; B66F 23/90; F15B 15/1447; F15B 15/00
See application file for complete search history.

(56) References Cited

U.S. PATENT DOCUMENTS

| | | | | |
|---|---|---|---|---|
| 4,839,835 | A * | 6/1989 | Hagenbuch | G07C 5/008 702/174 |
| 5,067,572 | A * | 11/1991 | Kyrtsos | E02F 9/264 177/139 |
| 6,815,023 | B1 | 11/2004 | Tatarka et al. | |
| 7,493,087 | B2 | 2/2009 | Puszkiewicz et al. | |
| 8,833,736 | B2 | 9/2014 | Feiquan et al. | |
| 2002/0144862 | A1 | 10/2002 | Engvall et al. | |
| 2004/0158380 | A1* | 8/2004 | Farber | B66F 17/003 701/50 |
| 2006/0001224 | A1* | 1/2006 | Bitter | B66F 17/003 280/6.159 |
| 2008/0019815 | A1 | 1/2008 | Harris et al. | |
| 2008/0319710 | A1 | 12/2008 | Hsu et al. | |
| 2010/0161185 | A1* | 6/2010 | Marathe | E02F 9/264 701/50 |
| 2014/0107897 | A1 | 4/2014 | Zhu et al. | |
| 2015/0217981 | A1 | 8/2015 | Baillargeon et al. | |
| 2015/0354177 | A1* | 12/2015 | Shatters | G01G 19/10 414/21 |
| 2016/0083233 | A1 | 3/2016 | Yamada et al. | |
| 2017/0023349 | A1* | 1/2017 | Rannow | G01L 27/002 |

FOREIGN PATENT DOCUMENTS

| | | |
|---|---|---|
| CN | 201704039 U | 1/2011 |
| CN | 102491239 | 6/2012 |
| CN | 103640942 A | 3/2014 |
| CN | 205087891 U | 3/2016 |
| DE | 2019834 A1 | 11/1970 |
| EP | 1 186 568 | 3/2002 |
| JP | 5-4798 | 1/1993 |
| JP | 6-135699 | 5/1994 |
| JP | 6-286998 | 10/1994 |
| JP | 2014-500209 | 1/2014 |

OTHER PUBLICATIONS

Extended European Search Report dated Nov. 6, 2020 issued in European Patent Application No. 18745371.7, 10 pp.
Japanese Office Action dated Oct. 20, 2020 issued in Japanese Patent Application No. 2019-540075 and English translation, 17 pp.
International Search Report dated Apr. 9, 2018 issued in PCT International Patent Application No. PCT/US2018/014963, 1 page.

* cited by examiner

PRESSURE BASED LOAD SENSING SYSTEM

This application is the U.S. national phase of International Application No. PCT/US2018/014963 filed Jan. 24, 2018 which designated the U.S. and claims priority to U.S. Provisional Patent Application No. 62/450,274 filed Jan. 25, 2017, the entire contents of each of which are hereby incorporated by reference.

CROSS-REFERENCES TO RELATED APPLICATIONS

This application claims the benefit of U.S. Provisional Patent Application No. 62/450,274, filed Jan. 25, 2017, the entire content of which is herein incorporated by reference.

STATEMENT REGARDING FEDERALLY SPONSORED RESEARCH OR DEVELOPMENT (NOT APPLICABLE)

BACKGROUND

The invention relates to a load sensing system that measures lift cylinder pressure and platform height to estimate the platform load in a scissor lift or the like. The system functions to prevent overload and is designed to comply with regulatory requirements.

Existing load sensing systems using force measurement are accurate and easy to calibrate but can be costly and complex. Existing systems using pressure measurement severely de-rate platform capacity in cold temperatures. Additionally, existing systems require semi-annual re-calibration using test weights equivalent to the vehicle's rated capacity. Transporting these test weights to remote sites and handling the weights with an overhead crane is often difficult.

Existing load sensing systems using pressure measurement are only able to predict platform load during lift motion. This means the user and vehicle are only protected from overload during dynamic situations. Moreover, these load sensing systems typically require the vehicle to lift to full height during the calibration process; however, ceiling height may be prohibitive. Still further, existing drive cutout systems for job sites in some markets attempt to detect lift up motion using limit switches; however, the requirement to cutout drive within 10 cm of lift means the apparatus must be carefully adjusted and mounted in an exposed location.

BRIEF SUMMARY

The system of the described embodiments provides the advantages of the force-based approach using a simple, lower cost pressure-based measurement system. The system is able to provide accurate platform load prediction over a wide temperature range and provides a method to quickly verify calibration without test weights. The system provides protection from overload while the vehicle is in motion or at rest. The system is also able to calibrate at partial height and then regard this as the maximum height. The system uses pressure measurements from the load sensing system to detect this situation without adjustments or additional sensors.

The system of the described embodiments has the following advantages over competitive devices:

1. Costs less than load sensing systems that use force measurement
2. Maintains prediction accuracy over wide temperature range
3. Provides an easy to use verification feature instead of recalibration with test weights
4. Protects the user and vehicle from overload in static and dynamic situations
5. Allows calibration in situations with limited ceiling height
6. Furnishes option for accurate calibration without test weights (field) or highly accurate calibration with test weights (factory or service depot)
7. Displays the platform load intuitively (LBS/KGS) for safety inspectors and service technicians.

In an exemplary embodiment, a method of detecting an overload condition on a liftable platform includes the steps of (a) measuring head end pressure in the hydraulic lift cylinder; (b) measuring rod end pressure in the hydraulic lift cylinder; (c) measuring a lift arm angle; (d) determining a platform height from the lift arm angle; (e) determining a platform load based on the input from the head end pressure transducer, the input from the rod end pressure transducer, and the platform height; and (f) indicating the overload condition when the platform load exceeds a predefined load.

Step (a) may include providing two independent readings for redundancy, and step (b) may include providing two independent readings for redundancy. The method may further include, after step (c), verifying accuracy of the lift arm angle measured in step (c). Step (e) may include calculating a lift cylinder force based on the inputs from steps (a) and (b), where the method may further include conducting a calibration sequence by recording the lift cylinder force at a plurality of platform heights with the platform empty. The method may further include conducting a verification sequence after conducting the calibration sequence by recording the lift cylinder force at the plurality of platform heights with the platform empty, the verification sequence satisfying a periodic maintenance inspection requirement. The method may further include conducting a second calibration sequence by recording the lift cylinder force at the plurality of platform heights with a rated load on the platform. The calibration sequence may be conducted without raising the lift arm to a maximum height position. Step (e) may include determining the platform load also based on platform lift or lower speed. Step (f) may include indicating the overload condition when the platform load exceeds 110% of a rated capacity for a predefined period of time. The method may further include preventing platform lift up when the overload condition is indicated in step (f).

In another exemplary embodiment, a platform load sensing system detects an overload condition on a liftable platform. The platform is raised and lowered on a lift arm using a hydraulic lift cylinder including a head end and a rod end. The platform load sensing system may include a head end pressure transducer positioned at the head end that is configured to measure head end pressure in the hydraulic lift cylinder and a rod end pressure transducer positioned at the rod end that is configured to measure rod end pressure in the hydraulic lift cylinder. A main rotary angle sensor is configured to measure a lift arm angle. Control circuitry communicating with and receiving input from the head end pressure transducer, the rod end pressure transducer, and the main rotary angle sensor is programmed to calculate a platform height based on the lift arm angle and to calculate a platform load based on the input from the head end pressure transducer, the input from the rod end pressure transducer, and the platform height. The control circuitry is programmed to indicate the overload condition when the platform load exceeds a predefined load.

The system may include a backup rotary angle sensor that is configured to verify accuracy of the main rotary angle sensor.

BRIEF DESCRIPTION OF THE DRAWINGS

These and other aspects and advantages will be described in detail with reference to the accompanying drawings, in which.

DETAILED DESCRIPTION

Figure 1:
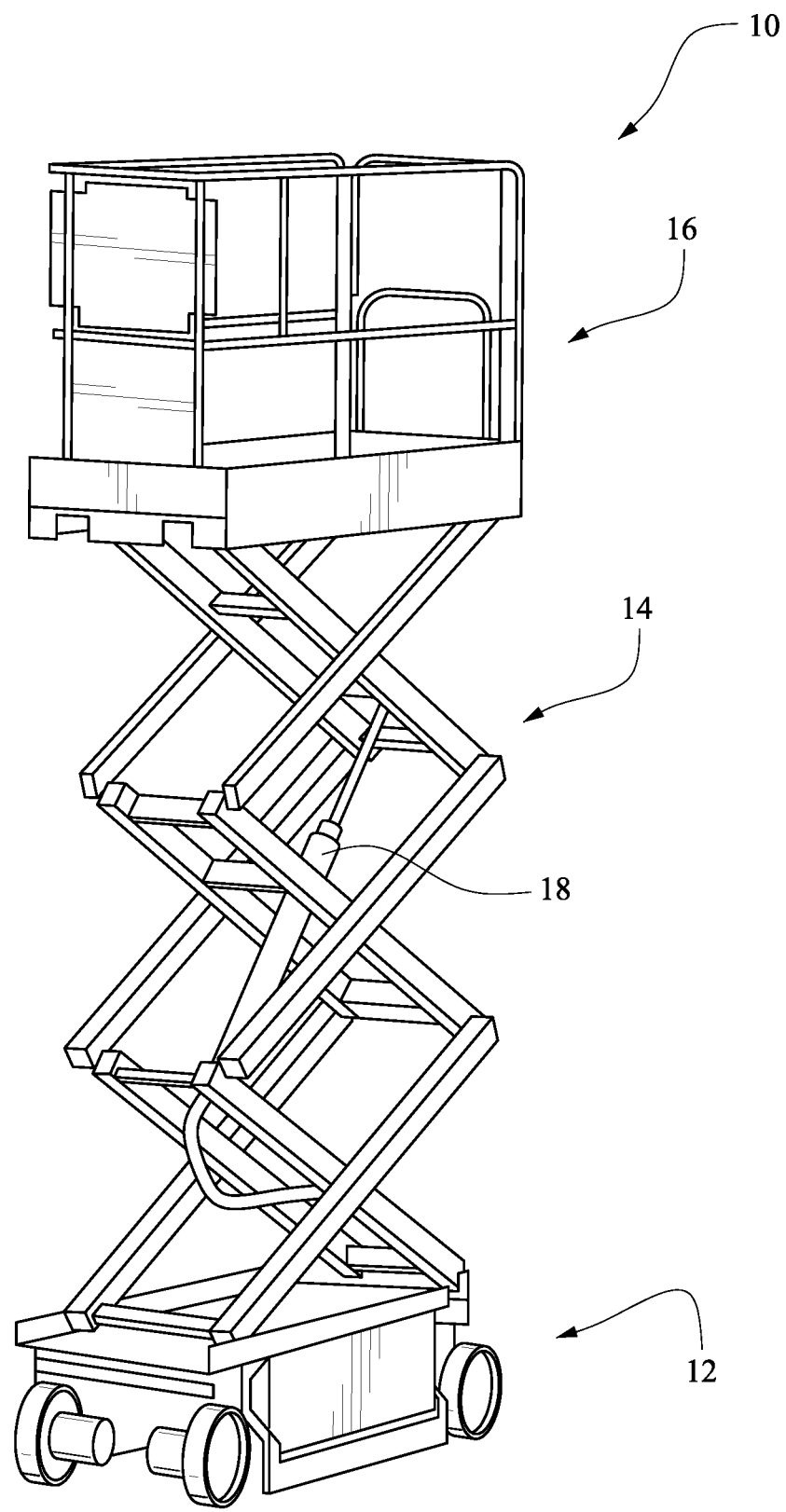
FIG. 1 shows an exemplary liftable platform that is raised and lowered on a lift arm using a hydraulic lift cylinder.

The platform load sensing system of the invention will be described with reference to an exemplary application to a scissor lift 10 as shown in FIG. 1. The scissor lift 10, however, is exemplary, and the platform load sensing system is applicable for detecting an overload condition on any liftable platform. The invention is thus not meant to be limited to the exemplary scissor lift shown in FIG. 1.

As shown in FIG. 1, the exemplary scissor lift 10 generally includes a wheeled chassis 12, an arm stack 14 supported on the chassis 12, and a platform 16 supported on the arm stack 14. The platform 16 is raised and lowered by displacing the arms in the arm stack 14 with a hydraulic lift cylinder 18. The use and operation of the scissor lift 10 and the hydraulic lift cylinder 18 are known and will not be described in further detail.

Figure 2:
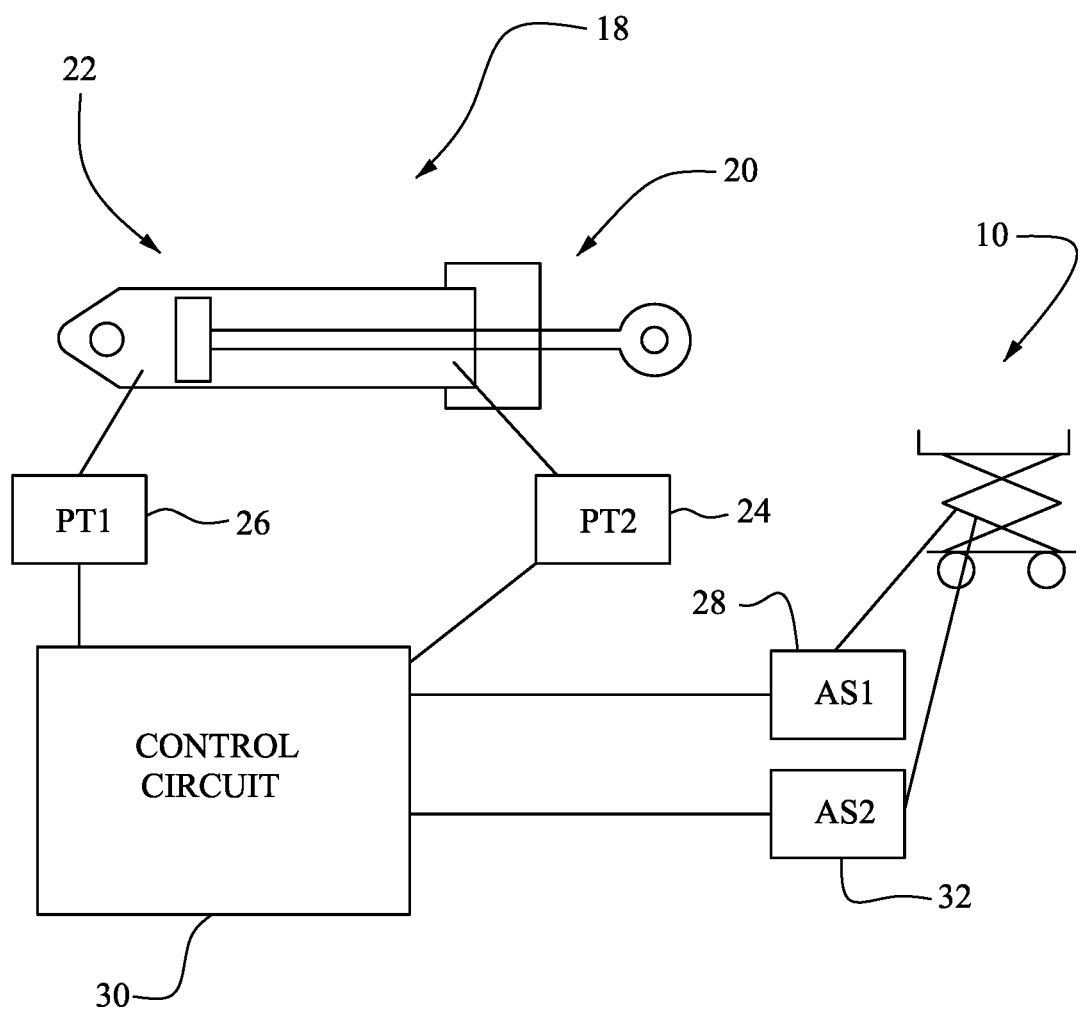
FIG. 2 is a schematic illustration of the platform load sensing system of the described embodiments.

With reference to FIG. 2, the hydraulic cylinder 18 includes a head end 20 and a rod end 22, as is conventional. A head end pressure transducer 24 (labeled "PT2") is positioned at the head end is configured to measure head and pressure in the hydraulic lift cylinder 18. A rod end pressure transducer 26 (labeled "PT1") is configured to measure rod end pressure in the hydraulic lift cylinder 18. A main rotary angle sensor 28 (labeled "AS1") is configured to measure a lift arm angle on which the platform is mounted (the exemplary scissor lift 10 is also shown in FIG. 2). Control circuitry 30 communicates with and receives input from the head end pressure transducer 24, the rod end pressure transducer 26, and the main rotary angle sensor 28. The control circuitry 30 is programmed to calculate a platform height based on the lift arm angle from the main rotary angle sensor 28 and to calculate a platform load based on the input from the head end pressure transducer 24, the input from the rod end pressure transducer 26, and the platform height. The control circuitry 30 is programmed to indicate the overload condition when the platform load exceeds a predefined load (described in more detail below).

In some embodiments, each of the head end pressure transducer 24 and the rod end pressure transducer 26 is configured to provide two independent readings for redundancy. The system may also include a backup rotary angle sensor 32 (labeled "AS2") that is configured to verify the accuracy of the main rotary angle sensor 28. The back-up rotary angle sensor 32 serves to verify that the main rotary angle sensor 28 has not failed.

The control circuitry 30 may be programmed to calculate a lift cylinder force based on the inputs from the head end pressure transducer 24 and the rod end pressure transducer 26 using mathematical relationships, including the cylinder rod/barrel geometry. Unlike existing systems, since the pressure-based load sensing system of the described embodiments utilizes head end pressure and rod end pressure, influences from temperature changes can be accommodated. That is, at cold temperatures, for example, changes in viscosity of rod end lubrication can cause pressure increases in the rod end. Incorporating rod end pressure measurements into the lift cylinder force calculation results in a more accurate load determination. Determining the platform load may also be based on platform lift or lower speed (when the platform is in motion).

The control circuitry 30 is programmed to conduct a calibration sequence by recording the lift cylinder force at a plurality of platform heights with the platform empty. An optional calibration sequence may also be conducted with a weighted load to record additional force information to thereby further improve performance Once the calibration is complete, the system will predict platform load based on lift cylinder force and platform height in order to determine if an overload condition exists. Calibration in an indoor environment with limited ceiling heights will be provided (described in more detail below). As such, the calibration sequence can be conducted without raising the lift arm to its maximum height position. The control circuitry 30 may be further programmed to conduct a verification sequence after conducting the calibration sequence by recording the lift cylinder force at the plurality of platform heights with the platform empty. Verification will pass if the measurements agree with the calibration within a tolerance. The verification sequence can be used by users/customers to fulfill periodic maintenance inspection requirements.

The platform load sensing system is designed and configured to detect when a platform is overloaded and to provide a visual and acoustic warning, while also halting further movement of the machine. For system calibration, as an exemplary pre-condition, it is desirable for the vehicle to be operating in ground mode or platform mode. The set up load must be set to "cut out platform" or "cut out all" for the system to be configured. Additionally, the rotary angle sensors must be calibrated, and the calibration sequence for the load sensing system must be completed.

In use, the control circuitry accesses a digital output resource as a ground overload indicator (e.g., visual and audio). The resource is de-energized when the system is not configured. Once configured, the overload flag is set to FALSE, and the circuitry flashes the ground overload indicator after power up. This measure is a subtle indication for service technicians and users that the system will cut out at less than rated capacity because calibration was performed without 110% rated load (empty deck only). When the system is configured and the overload signal is TRUE, the control circuitry flashes the ground overload indicator including an audible alarm to indicate that the platform is overloaded.

A control circuit 30 receives an analog input from the head end pressure transducer 24 to measure lift cylinder barrel pressure using a mathematical formula. The reading is filtered in order to reduce system noise, and the filtered and processed reading is used for the load sensing analysis. In some embodiments, the control circuit 30 utilizes the second independent signal from the head end pressure transducer 24 for a secondary filtered and processed reading. The control circuit 30 conducts similar processing for a signal or signals from the rod end pressure transducer 26. The lift cylinder force may then be calculated using the resulting filtered values along with the cylinder barrel area in a series of mathematical formulas.

Figure 3:
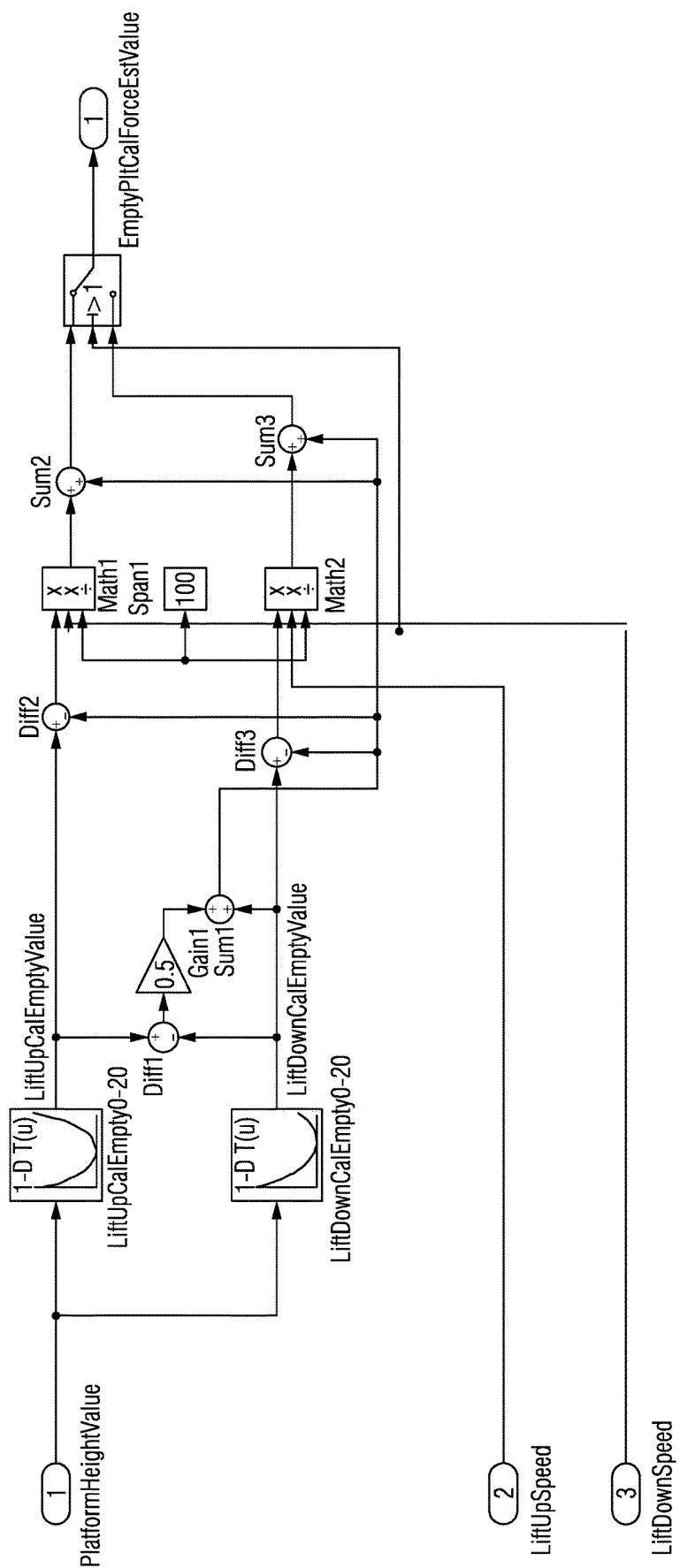
FIGS. 3 and 4 are schematic illustrations showing empty and loaded platform calibration force estimates, respectively.
Figure 4:
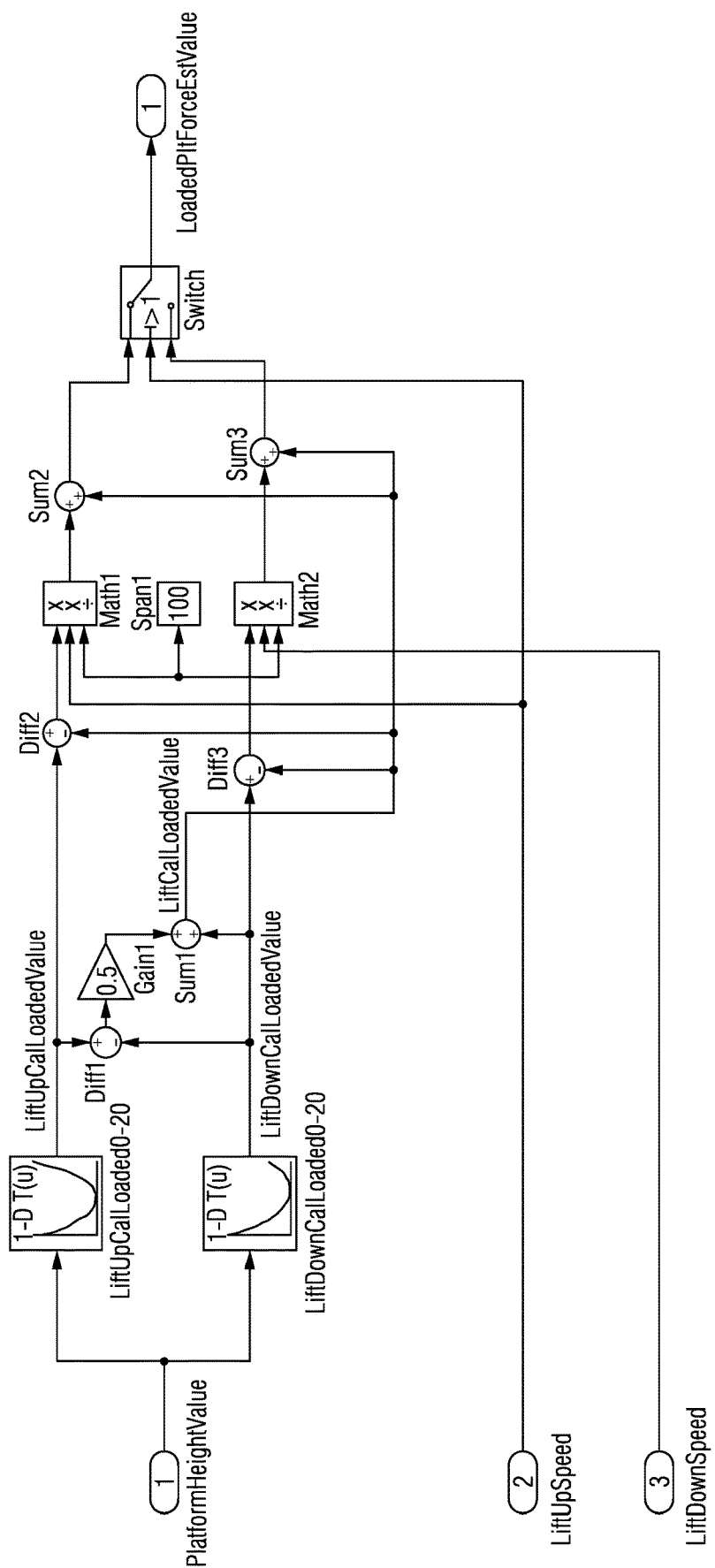

In some embodiments, the control circuit 30 will estimate the lift cylinder force for an empty platform based on the empty deck calibration information, platform height, and lift speed. This estimate incorporates friction from the arm stack pins, lift cylinder seal, and slide blocks. With reference to FIG. 3, the control circuit 30 uses the platform height value to interpolate within calibration data arrays to calculate a lift up empty value and a lift down empty value, respectively. The control circuit 30 calculates the empty platform force estimate value through linear interpolation based on the lift up speed value and lift down speed value. A similar process is conducted for estimating the loaded platform calibration force. With reference to FIG. 4, the system will estimate the lift cylinder force for 110% rated load in the platform based on the loaded deck calibration information, platform height, and lift speed. This estimate incorporates system friction when the service technician performs the Calibration—LOAD 110% procedure. The control circuit 30 uses the platform height value to interpolate within a lift up loaded data array and a lift down data loaded array. The circuit 30 calculates the loaded platform calibration force estimate through linear interpolation of the lookup values based on lift up speed and lift down speed.

The control circuit 30 estimates the current platform weight as a ratio of lift cylinder net force and the calibration information. The estimate is valid for static or dynamic (lifting) conditions. Specifically, the control circuit 30 calculates the difference of the lift cylinder net force value and the empty platform calibrated force estimated value and similarly calculates the difference of the loaded platform calibrated force estimated value and the empty platform calibrated force estimated value. The first difference is multiplied by a calibrated weight value and then divided by the second difference to calculate the platform weight value.

For an overload to occur, in some embodiments, the estimated platform weight must exceed 110% of the rated capacity longer than a "debounce" period. Overload can be detected while the vehicle is static or lifting. The control circuit 30 sets the overload state to TRUE when the platform weight value exceeds 110% of the rated capacity or max capacity value for a period longer than the preset debounce period. The circuit 30 sets the overload state to FALSE when the platform weight value falls below 110% of the rated capacity for a period longer than a preset hold period.

In a platform mode, the control circuit 30 prevents lift up when the platform height exceeds the partial height calibration. When the platform is overloaded, the control circuit 30 prevents drive, steer and lift up. In some embodiments, when the platforms is overloaded and the system is set to cut out platform or cut out all, lift down is prevented once the platform reaches a threshold height in the same fashion as in ground mode. Alternatively, lift down may be always permitted.

The control circuit 30 may provide a feature to verify the calibration at periodic maintenance intervals. The technician can use the same basic procedure as an empty platform calibration, and the system will compare the measurements to the existing calibration. If the system was calibrated at partial height (e.g., indoors with limited ceiling height), the verification will be limited to that height or lower.

The control circuit 30 may continuously monitor the pressure transducer readings to ensure that the readings remain within a preset measurement range. When a reading exceeds the measurement range, the control circuit 30 may be configured to protect the hardware and assume the platform is overloaded. Similarly, the control circuit 30 may continuously compute the difference between the independent pressure transducer readings. When the differences become excessive, the control circuit 30 assumes the platform is overloaded. Similarly, the control circuit 30 may continuously monitor the rod end pressure transducer 26 and ensure that the pressure is zero when the vehicle is motionless. The pressure is permitted to be non-zero when the vehicle is driving, steering, lifting, or manual descent is being used.

The control circuit 30 may be configured to assume the platform is overloaded when any of the following situations occur:

lift cylinder barrel pressure out of range low
    lift cylinder barrel cylinder pressure out of range high
    lift cylinder barrel pressure excessive difference (transducer scale factor issue)
    lift cylinder rod pressure out of range low
    lift cylinder rod pressure out of range high
    lift cylinder rod pressure stagnant (non-zero without lift)
    load sensing system has not been calibrated
    load sensing system fails verification.

The vehicle system will react conservatively and overpredict platform load when any of the following situations occur:

lift cylinder rod pressure transducer scale factor too low
    lift cylinder rod pressure stagnant (zero during lift).

In some embodiments, the control circuit 30 may prevent drive when the platform is lifted by as little as 10 cm. In some markets, safety inspectors believe that accidents are attributable to driving with the platform elevated (by even small amounts), so this activity is prohibited, and vehicles without this feature in these restrictive markets may be rejected from the site. Other markets view this feature as extremely restrictive and may not use a vehicle if the feature cannot be disabled. To manage this field situation, the vehicle may be fitted with a hidden switch so that this feature can be changed on delivery to a job site without the need for a service technician. The feature is made to be disabled when the switch is open or not fitted and enabled when the switch is closed. In these configurations, on-vehicle verification may be conducted to ensure the thresholds manage the feature at the desired cutout height independent of platform weight.

A calibrations—load 0% menu may be visible when the machine set up load is "cut out platform" or "cut out all." The menu may be hidden when the vehicle is in safe mode. In some embodiments, the menu may be set up in the format shown in the table below:

| MENU | SUBMENU | COMMENTS |
| --- | --- | --- |
| CALIBRATIONS: LOAD 0% | CAL LOAD: YES: ENTER; NO: ESC | The technician chooses to calibrate by pressing ENTER, or leave by pressing ESC. |
| | CAL LOAD: FAIL NOT IN | The technician must be in GroundMode in order to conduct a load calibration. If CAL FAIL occurs the |

| MENU | SUBMENU | COMMENTS |
|---|---|---|
| | GND MODE | previous CAL values shall be used. |
| | CAL LOAD: FAIL CAL ANGLE | The Load Sensing System calibration was unsuccessful because the Elevation sensor has not been calibrated. The Elevation sensor MUST be calibrated before a LOAD calibration can occur. This check is made before the statement "PLATFORM EMPTY?" is displayed. If CAL FAIL occurs the previous CAL values shall be used. |
| | CAL LOAD: PLATFORM EMPTY? | The technician shall verify the platform is empty and continue by pressing ENTER, or leave by pressing ESC. |
| | CAL LOAD: FAIL PLAT NOT STOWED | The technician attempted to perform a LOAD calibration when the platform was not stowed. PlatformHeightValue is not within (PhysicalMinHeightValue ± 2") before an angle calibration can be performed. |
| | CAL LOAD: LIFT TO MAX ELEV | The technician engages lift up until the platform reaches maximum height and then presses ENTER. During lift up the system module performs calculations and records data points as specified in Load Calibration section in SRD. |
| | CAL LOAD: LOWER TO STOWED | The technician engages lift down until the platform is stowed and then presses ENTER. During lift down the system module performs calculations and records data points as specified in Load Calibration section in SRD. |
| | CAL LOAD: FAIL MOTION STOPPED | Lift Down was disengaged before the calibration data points were acquired. This ensures machine has been lifted down to the minimum height that load sensing occurs. |
| | CAL LOAD: COMPLETE! | The Load Sensing System calibration was successful. |
| | CAL LOAD: CAL FAIL | If technician presses ESC at any time or Load Sensing System calibration was not successful. If CAL FAIL occurs the previous CAL values shall be used. |

For lift up calibration, once lift up has been engaged, the control circuit calculates the lift cylinder force value when the platform height reaches predefined model-specific platform heights. The control circuit stores the net force values in the data array to create a calibration curve. The circuit prevents lift up when the last data point is reached to prevent excessive hydraulic pressure at the mechanical limit. The control circuit prompts the technician to lower the platform to the stowed position for the lift down calibration. If lift up is disengaged before the last data point is reached, the control circuit sets the remaining array entries to an undefined value and allows the procedure to continue. This is desired so that the vehicle can be calibrated indoors with limited ceiling height. A similar procedure is conducted for the lift down calibration. Once lift down has been engaged, the control circuit captures the lift cylinder net force values when the platform height reaches predefined values of the model-specific platform heights. The control circuit stores the cylinder force values in the data array to create a calibration curve. If lift down is disengaged before the last data point is collected, an error message is displayed, and the previous calibrated values are retained. Once calibration is complete, the control circuit may evaluate the measurements collected against limits based on the physics model and vehicle testing. The evaluation is passed when the calibration meets all guidelines. The circuit excludes undefined values in both arrays to allow partial height calibration.

The Calibrations—LOAD 110% menu may be set up in the format shown in the table below:

| MENU | SUBMENU | COMMENTS |
|---|---|---|
| CALIBRA- TIONS: LOAD 110% | CAL LOAD: YES: ENTER; NO: ESC | The technician chooses to calibrate by pressing ENTER, or leave by pressing ESC. |
| | CAL LOAD: FAIL CAL0% NOT DONE | The technician must successfully complete the Calibration → Load 0% procedure before this calibration can occur. |
| | CAL LOAD: FAIL NOT IN GND MODE | The technician must be in GroundMode in order to conduct a load calibration. If CAL FAIL occurs the previous CAL values shall be used. |
| | CAL LOAD: FAIL CAL ANGLE | The Load Sensing System calibration was unsuccessful because the Elevation sensor has not been calibrated. The Elevation sensor MUST be calibrated before a LOAD calibration can occur. This check is made before the statement "110% RATED LOAD?" is displayed. If CAL FAIL occurs the previous CAL values shall be used. |
| | CAL LOAD: 110% RATED LOAD? | The technician shall verify the platform has 110% rated load (ESSCalWeightValue) and continue by pressing ENTER, or leave by pressing ESC. |
| | CAL LOAD: FAIL | The technician attempted to perform a LOAD calibration when the platform was not stowed. PlatformHeightValue |

| MENU | SUBMENU | COMMENTS |
|---|---|---|
| | PLAT NOT STOWED | is not within (PhysicalMinHeightValue ± 2") before an angle calibration can be performed. |
| | CAL LOAD: LIFT TO MAX ELEV | The technician engages lift up until the platform reaches maximum height and then presses ENTER. During lift up the system module performs calculations and records data points as specified in Load Calibration section in SRD. |
| | CAL LOAD: LOWER TO STOWED | The technician engages lift down until the platform is stowed and then presses ENTER. During lift down the system module performs calculations and records data points as specified in Load Calibration section in SRD. |
| | CAL LOAD: FAIL MOTION STOPPED | Lift Down was disengaged before the calibration data points were acquired. This ensures machine has been lifted down to the minimum height that load sensing occurs. |
| | CAL LOAD: COMPLETE! | The Load Sensing System calibration was successful. |
| | CAL LOAD: CAL FAIL | If technician presses ESC at anytime. If CAL FAIL occurs the previous CAL values shall be used. |

Lift up and lift down calibration may be established using similar procedures discussed above with the calibration at LOAD 0%.

The control circuit 30 may also provide a means to verify system calibration by collecting data while the loaded platform lifts up and then down. The data should agree with the LOAD 0% calibration data within a type tolerance to receive an affirmative response. To deal with partial height calibration, the control circuit 30 may cut out lift when the platform reaches the maximum height at which the system was calibrated. The verification menu may be set up in the format shown in the table below:

| MENU | SUBMENU | COMMENTS |
|---|---|---|
| CALIBRA- TIONS: | VERIFY LOAD: YES: ENTER; NO: ESC | The technician chooses to verify calibration by pressing ENTER, or leave by pressing ESC. |
| VERIFY LOAD | VFY LOAD: FAIL CAL0% NOT DONE | The technician must successfully complete the Calibration → Load 0% procedure before this verification can occur. |
| | VFY LOAD: FALL NOT IN GND MODE | The technician must be in Ground Mode in order to conduct a load verification. |
| | VFY LOAD: FAILnCAL ANGLE | The verification was unsuccessful because the Elevation sensor has not been calibrated. |
| | VERIFY LOAD: PLATFORM EMPTY? | The technician shall verify the platform is empty and continue by pressing ENTER, or leave by pressing ESC. |
| | VFY LOAD: FAIL PLAT NOT STOWED | The technician attempted to perform a verification when the platform was not stowed. PlatformHeightValue is not within (PhysicalMinHeightValue ± 2") before verification can be performed. |
| | VERIFY LOAD: LIFT TO MAX ELEV | The technician engages lift up until the platform reaches maximum height or the lift up switch is released. During lift up the system module performs records data points as specified in Load Calibration section in SRD. |
| | VERIFY LOAD: LOWER TO STOWED | The technician engages lift down until the platform is stowed. During lift down the system module records data points as specified in Load Calibration section in SRD. |
| | VFY LOAD: FALL | Lift Down was disengaged before the verification data points were acquired. This |

-continued

| MENU | SUBMENU | COMMENTS |
|---|---|---|
| | MOTION STOPPED | ensures machine has been lifted down to the minimum height that load sensing occurs. LSS verification was successful. |
| | VERIFY LOAD: PASS | Refer to LSS Verification. |
| | VERIFY LOAD: FAIL | LSS verification was not successful. Refer to LSS Verification. |

For lift up verification, once lift up has been engaged, the control circuit may capture lift cylinder force values when the platform height reaches predefined model-specific platform heights from the lift up procedure within Calibration—LOAD 0%. The control circuit may store the lift cylinder force values in the data array to create a calibration curve. The control circuit prevents lift up at the height corresponding to the last valid entry in the loaded data array to manage partial height calibration. The control circuit may then prompt the technician to lower the platform to the stowed position for the lift down verification. If lift up is disengaged before the last data point is reached, the control circuit sets the remaining array entries to an undefined value and allows the procedure to continue. This is desired so that the vehicle can be verified indoors with limited ceiling height.

For lift down verification, once lift down has been engaged, the control circuit may capture the lift cylinder force values when the platform height values reach the predefined model-specific platform heights from the lift up procedure within the Calibration—LOAD 0%. The control circuit may store the lift cylinder force values in the data array to create a calibration curve. When the last data point is collected, the control circuit may compare the lift up verify data array to the lift up loaded data array, and compare the lift down verify data array to the lift down loaded data array, where the differences and tolerances may be calculated on an element by element basis according to predefined mathematical equations. The comparison may exclude undefined values in both arrays to allow partial height calibration and verification.

The system is equally applicable to a liftable platform utilizing double or multiple lift cylinders.

The system of the described embodiments provides the advantages of a force-based approach using a simple, lower cost pressure-based measurement system. The system is able to provide accurate platform load prediction over a wide temperature range. Additionally, the system provides a method to quickly verify calibration without test weights. Still further, the system provides protection from overload while the vehicle is in motion or at rest, and the system is able to calibrate at partial height.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. A platform load sensing system for detecting an overload condition on a liftable platform, the platform being raised and lowered on a lift arm using a hydraulic lift cylinder including a head end and a rod end, the platform load sensing system comprising:
    a head end pressure transducer positioned at the head end that is configured to measure head end pressure in the hydraulic lift cylinder;
    a rod end pressure transducer positioned at the rod end that is configured to measure rod end pressure in the hydraulic lift cylinder;
    a main rotary angle sensor that is configured to measure a lift arm angle; and
    control circuitry communicating with and receiving input from the head end pressure transducer, the rod end pressure transducer, and the main rotary angle sensor, wherein the control circuitry is programmed to calculate a platform height based on the lift arm angle and to calculate a platform load based on the input from the head end pressure transducer, the input from the rod end pressure transducer, and the platform height,
    wherein the control circuitry is programmed to indicate the overload condition when the platform load exceeds a predefined load,
    wherein the control circuitry is programmed to calculate a first lift cylinder force based on the inputs from the head end pressure transducer and the rod end pressure transducer,
    wherein the control circuitry is programmed to conduct a calibration sequence by recording the first lift cylinder force at a plurality of platform heights with the platform empty, and
    wherein the control circuitry is programmed to conduct a verification sequence after conducting the calibration sequence by recording a second lift cylinder force at the plurality of platform heights with the platform empty, the control circuitry being further programmed to pass the verification sequence if the recorded second lift cylinder forces agree with the first lift cylinder forces recorded during the calibration sequence within a tolerance.

2. A platform load sensing system according to claim 1, wherein the head end pressure transducer is configured to provide two independent readings for redundancy, and wherein the rod end pressure transducer is configured to provide two independent readings for redundancy.

3. A platform load sensing system according to claim 2, further comprising a backup rotary angle sensor that is configured to verify accuracy of the main rotary angle sensor.

4. A platform load sensing system according to claim 1, wherein the control circuitry is further programmed to conduct a second calibration sequence by recording the lift cylinder force at the plurality of platform heights with a rated load on the platform.

5. A method of detecting an overload condition on a liftable platform, the platform being raised and lowered on a lift arm using a hydraulic lift cylinder including a head end and a rod end, the method comprising:
    (a) measuring head end pressure in the hydraulic lift cylinder;
    (b) measuring rod end pressure in the hydraulic lift cylinder;
    (c) measuring a lift arm angle;
    (d) determining a platform height from the lift arm angle;
    (e) determining a platform load based on the input from the head end pressure transducer, the input from the rod end pressure transducer, and the platform height; and
    (f) indicating the overload condition when the platform load exceeds a predefined load,
    wherein step (e) comprises calculating a lift cylinder force based on the inputs from steps (a) and (b), the method further comprising conducting a calibration sequence by recording the lift cylinder force at a plurality of platform heights with the platform empty, conducting a verification sequence after conducting the calibration sequence by recording the lift cylinder force at the plurality of platform heights with the platform empty, the verification sequence satisfying a periodic maintenance inspection requirement, wherein the calibration sequence is conducted without raising the lift arm to a maximum height position, and wherein the verification sequence is limited to the height of the lift arm achieved in the calibration sequence.

6. A method according to claim 5, wherein step (a) comprises providing two independent readings for redundancy, and wherein step (b) comprises providing two independent readings for redundancy.

7. A method according to claim 6, further comprising, after step (c), verifying accuracy of the lift arm angle measured in step (c).

8. A method according to claim 5, further comprising conducting a second calibration sequence by recording the lift cylinder force at the plurality of platform heights with a rated load on the platform.

9. A method according to claim 5, wherein step (e) comprises determining the platform load also based on platform lift or lower speed.

10. A method according to claim 5, wherein step (f) comprises indicating the overload condition when the platform load exceeds 110% of a rated capacity for a predefined period of time.

11. A method according to claim 5, further comprising preventing platform lift up when the overload condition is indicated in step (f).

12. A platform load sensing system for detecting an overload condition on a liftable platform, the platform being raised and lowered on a lift arm using a hydraulic lift cylinder including a head end and a rod end, the platform load sensing system comprising:
    a head end pressure transducer positioned at the head end that is configured to measure head end pressure in the hydraulic lift cylinder;
    a rod end pressure transducer positioned at the rod end that is configured to measure rod end pressure in the hydraulic lift cylinder;
    a main rotary angle sensor that is configured to measure a lift arm angle; and control circuitry communicating with and receiving input from the head end pressure transducer, the rod end pressure transducer, and the main rotary angle sensor, wherein the control circuitry is programmed to calculate a platform height based on the lift arm angle and to calculate a platform load based on the input from the head end pressure transducer, the input from the rod end pressure transducer, and the platform height, wherein the control circuitry is programmed to indicate the overload condition when the platform load exceeds a predefined load, wherein the control circuitry is programmed to estimate a platform weight as a ratio of lift cylinder net force and calibration information including an empty platform calibrated force estimated value and a loaded platform calibrated force estimated value to thereby determine the overload condition in both static and dynamic lifting conditions.

13. A platform load sensing system according to claim 12, wherein the control circuitry is programmed to estimate the platform weight by calculating a first difference of the lift cylinder net force and the empty platform calibrated force estimated value and by calculating a second difference of the loaded platform calibrated force estimated value and the empty platform calibrated force estimated value, and by multiplying the first difference by a calibrated weight value and then dividing by the second difference.

\* \* \* \* \*